Aug. 26, 1958  R. A. TROIDL  2,848,931
FILM DEVELOPING APPARATUS
Filed July 26, 1955  2 Sheets-Sheet 1

Robert A. Troidl
INVENTOR.

BY
Attorneys

Aug. 26, 1958    R. A. TROIDL    2,848,931
FILM DEVELOPING APPARATUS
Filed July 26, 1955    2 Sheets-Sheet 2
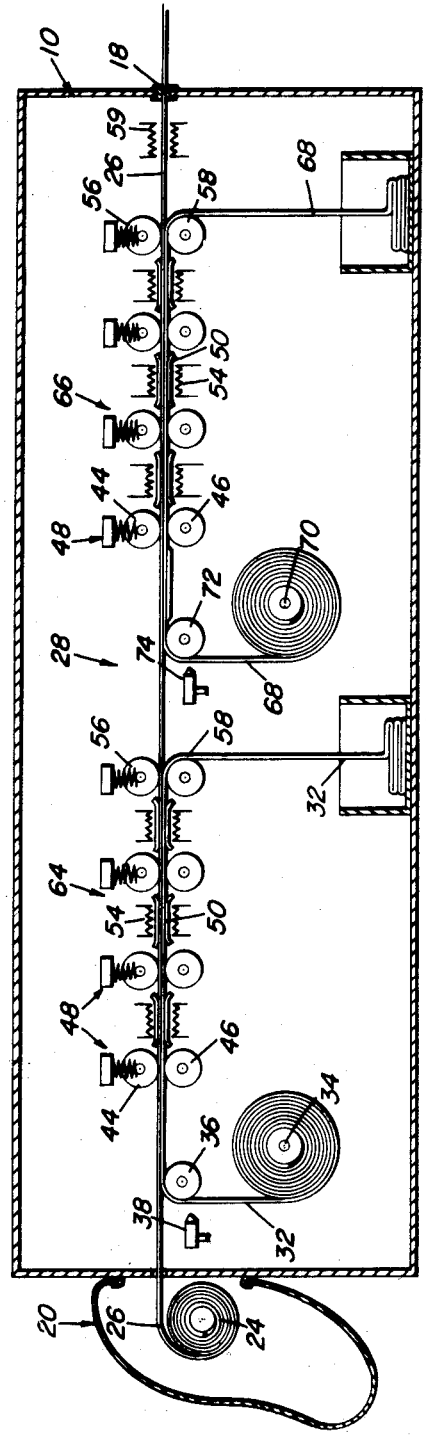
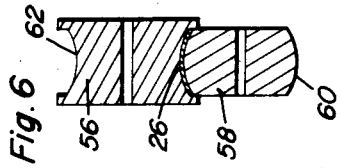
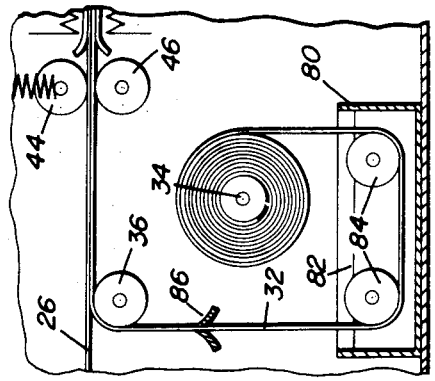
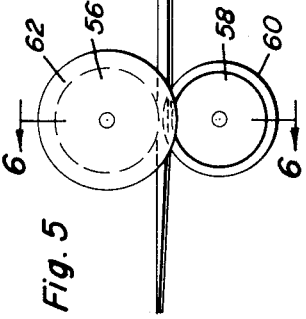
Robert A. Troidl
INVENTOR.

United States Patent Office 2,848,931
Patented Aug. 26, 1958

2,848,931

FILM DEVELOPING APPARATUS

Robert A. Troidl, Lake George, N. Y.

Application July 26, 1955, Serial No. 524,382

5 Claims. (Cl. 95—94)

The present invention relates to an apparatus and a process for using the same for the development of motion picture films and other sequence negatives on long strips of film.

In many industrial as well as other operations, it is highly desirable and, in fact, becoming necessary that exposed films be developed on the spot as quickly as possible in order that data may be quickly recorded, measured and viewed. The primary object of the invention is to provide a means whereby the quick development of film may be carried out without the necessity for a special dark room, solution pans, etc., such as are presently required.

A further object of the invention is in the provision of an apparatus for the quick developing of motion picture films which is readily portable and occupies a minimum of space.

A further object of the invention is in the provision of a film developing process and apparatus for carrying out the process wherein maximum strength developing, clearing and fixing solutions may be maintained at all times during the development of the film and whereby the processing of the film may be accomplished by photographically inexperienced personnel.

Essentially, the apparatus of the invention consists of an elongated, hollow, lightproof housing having film inlet and outlet slots at the opposite ends thereof. A suitable lightproof bag may be provided exteriorly of the housing at the inlet end thereof and the film, as it comes off the camera on its spindle may be inserted in the bag and the end of the film threaded into the housing through the inlet slot. Within the housing, there is a conveyor means which acts as a self-feeding means to draw the film through the housing through the outlet slot at the opposite end of the housing. Additionally, means are provided which cooperate with the conveyor means to press a developer carrying strip into engagement with the face of the film during a portion of the passage of the film through the housing, then releasing the developer carrier strip from the film and applying a clearing solution carrying strip to the film, releasing the clearing solution carrying strip from the film after a certain portion of the movement of the film, and thence applying a fixer carrier strip to the film for a portion of the movement of the film through the housing, after which the film is passed through the outlet slot. The development of the film thus proceeds rapidly and efficiently, necessitating a minimum of skill.

In the accompanying drawings:

Figure 2 is a side elevational view in cross-section of a multistage apparatus for carrying out the principles of the invention;

Figure 3 is an enlarged cross-sectional detail view of a modification of the manner in which the developer, fixer and clearing solutions may be applied to their respective carrier strips;

Figure 5 is an enlarged detail view of the end rollers of each run or section of the conveyor means; and Figure 6 is an end view of the rollers of Figure 5.

Figure 1:
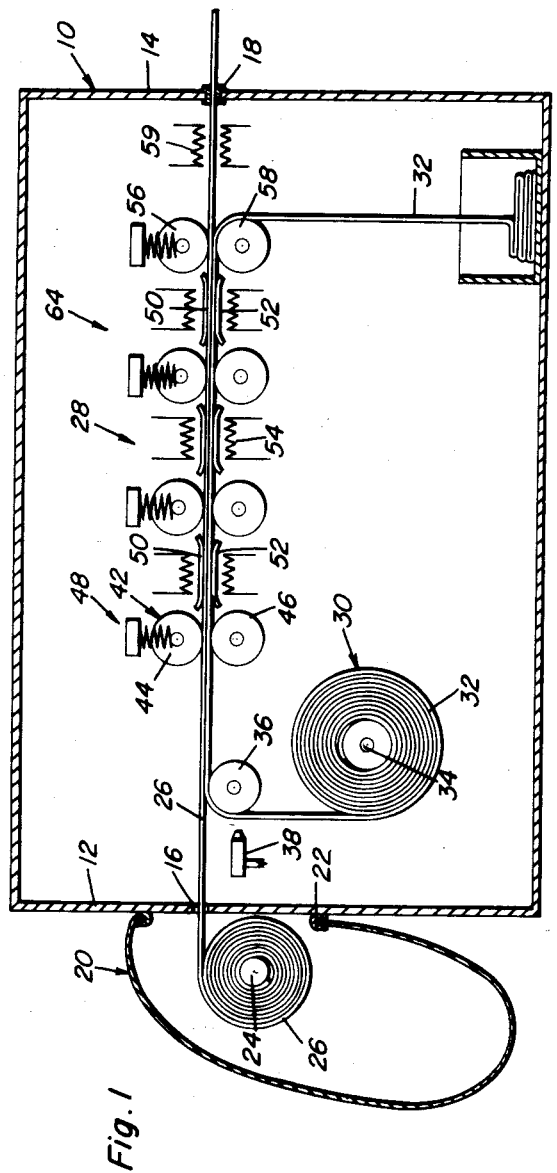
Figure 1 is a side elevational view in cross-section of a suitable apparatus for carrying out the principles of the invention.

Referring now to the drawings in detail, attention is first directed to Figure 1 wherein there is disclosed in cross-section a rectangular, lightproof housing 10 having end walls 12 and 14, the end wall 12 having a film entrance slot or opening 16 therein and the end wall 14 having a film exit or discharge slot 18 therein. A lightproof bag 20 has the open end thereof engaged over suitable brackets 22 mounted on the exterior surface of the end wall 12 in surrounding relation to the entrance slot 16. It is into this bag 20 that the exposed film is first introduced. To introduce the film, the magazine with the exposed film from the camera is introduced into the change bag 20, which bag encloses the feed spindle 24 for the apparatus 10. Once in the bag 20, the exposed film 26 is attached to the feed spindle 24 upon removal from the magazine, and the end of the film fed through the entrance slot 16 into the housing 10.

Once within the housing, the film web or strip 26 is moved through the housing by conveyor means 28 which moves the film through the housing and out the discharge slot 18. Means 30 within the housing cooperates with the conveyor means 28 for developing the film as it passes through the housing.

The means 30 comprises a chemical carrier strip 32 wound on a spindle 34 carried within the housing. An idler roller or sheave 36 guides the strip or web 32 into contact with the face of the film strip 26. In order to operate, the surface of the chemical carrier strip 32 which may be considered a developer strip is treated with a developing chemical and engages the emulsion side of the film strip 26, by being brought into firm contact with each other by pressure exerted immediately by passing through pressure rollers 44 and 46.

Conveyor means 28 retains the chemical carrier strip 32 in contact with the film strip 26 throughout a portion of the length of the movement of the film through the housing 10 whereby the exposed film is developed. The developer carrier strip 32 may be pre-coated with suitable developing chemicals, or these chemicals may be added to the surface of the strip in the manner shown in any one of Figures 1, 3 or 4.

In Figure 1, there is disclosed a spray nozzle 38 which is connected to a suitable source of developing solution, not shown, which sprays the developing solution in the proper concentration onto the surface of the strip 32. Immediately thereafter, the strip is brought into contact with the film strip 26 and moved along therewith so that the developer solution is in contact with the emulsion side of the film, and as the film strip 26 and the developer solution carrying strip 32 are carried along by the conveyor means 28, the film is developed. After development thereof, the developer carrier strip 32 is separated from the film and discarded in any suitable manner.

The conveyor means 28 comprises longitudinally spaced pairs of rollers 42 with the rollers of each pair being disposed in vertically spaced relation to one another, the upper rollers being designated by the numeral 44 and the lower rollers by the numeral 46. Suitable resilient means 48 carried within the housing 10 engage the upper rollers 44 and resiliently bias them toward the lower rollers 46. The first set of pressure rollers 44 and 46 are located immediately adjacent to where film strip 26 and carrier strip 32 join.

Between the pairs of rollers 44 and 46, the conveyor means comprises a plurality of upper and lower spaced plates 50 and 52 between which the film and its associated carrier strip 32 pass. Heating elements 54 may heat certain or all of the plates 50 and 52 in order to properly develop the film and at the end of the film processing to dry the film just prior to the emergence of the film from the box. Noting Figures 1 and 2, it will be seen that the film drying may be accomplished by heating elements 59 and a blower (not shown) adjacent the slot 18.

The end rollers 56 and 58 of each run of the conveyor means 28, the length of the run of the conveyor means being determined by the distance a single carrier strip is carried therealong, are specially formed to enable the separation of the chemical carrier strip 32 from the film web 26.

As shown in Figures 5 and 6, the end rollers 56 and 58 are specially formed with the lower roller 58 being crowned, as at 60, and the upper roller 56 being concave, as at 62. Film by itself, especially when wet from the chemical developing, fixing or clearing solution, is very limp and although easily separated from the chemically wetted carrier strip, is not ordinarily self-sustaining so that it may pass the remaining distance to the outlet slot 18, or in the event that a developer and a fixer or developer, clearer and fixer are used, etc., pass between the connected runs of conveyor means 28. But, by arching the film transversely by passing it through the specially shaped end rollers 56 and 58 of each run or section of the conveyor means 28, the film is stiffened sufficiently so that it will pass between the runs or through the outlet slot 18.

In Figure 2, the conveyor means 28 consists of two runs 64 and 66 respectively, one of the runs being for the developer carrier strip 32 previously noted and the other of the runs 66 being for the fixer or clearer chemical carrying strip 68.

To carry the fixer carrying strip 68, the housing has a spindle 70 therein and to guide the strip 68 onto the undersurface of the film strip 26, idler roller 72 is provided within the housing. Run 66 of the conveyor means 28 is identical to run 64 described with reference to Figure 1.

Further, to spray the desired fixed solution onto the surface of the carrier strip 68, the spray nozzle 74 is provided adjacent the idler roller or sheave 72. Before the carrier strip 68 reaches the discharge slot 18 of the housing, it is separated from the film strip 26 and discarded in any suitable manner.

After use, the carrier strip portions which have been used are torn off and thrown away. Obviously, as many carrier strips 32, 68 may be utilized as considered necessary.

In Figure 3, there is disclosed a modified means of applying solution to the carrier strips 32 and 68, this means constituting a solution holding vat or vessel 80 disposed on the bottom of the housing 10 and being filled with a developer solution 82 in the case of developer carrying strip 32, as shown.

A pair of horizontally spaced rollers 84 are carried within the vessel 80 and the carrier strip 32 entrained underneath these rollers 84 and thence upwardly to the idler roller 36. Suitable wipers between the idler roller 36 and the guide rollers 84 designated by the numeral 86 may be provided to wipe excess solution from the carrier strip 32.

Figure 4:
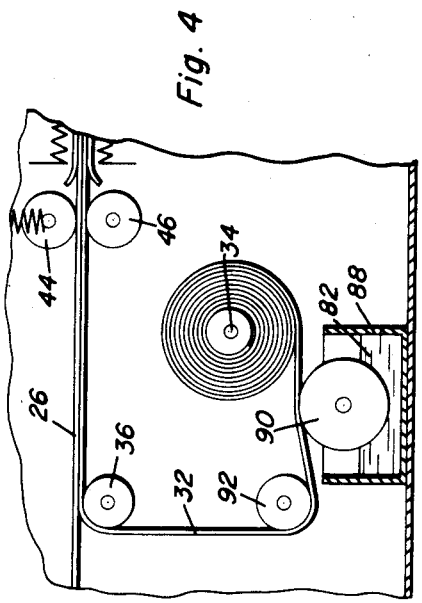
Figure 4 is another modification of the manner in which the solutions may be applied to their carrier strips.

Yet another method for applying solution to the face of the carrier strip 32 may be utilized as shown in Figure 4 wherein a small solution holding vessel 88 is provided with a large rotating roller 90 picking up the solution 82 from the vessel and calendering it on the carrier strip 32 as the strip is unwound from the spindle 34 and entrained under a guide roller 92 spaced beyond the strip calendering roller 90 for guiding the web of the strip 32 thereover.

Regardless of how the solution is applied, whether the strip have a paste or solution calendered or sprayed thereon, or whether the strip be initially prepared with the desired chemicals thereon, the concentration of the developers, clearing and fixing chemicals is subject to complete control with no diminishing of quality or concentration regardless of the amount of film developed through the apparatus.

In the operation of the device, the action of the chemical of the developer carrier strip 32 on the emulsion of the film causes the development, and the image of property density is formed on the film.

At the end of this run of the cycle through the housing 10, the carrier strip 32 is mechanically separated from contact with the film 26 and is thence discarded.

When a second chemical carrier strip, such as 68, is now brought into contact with the emulsion side of the film as it continues to move forward on its cycle through the second run of the conveyor means and the action of the clearer of fixer, whichever it may be, clears and/or fixes the film as it passes through this part of the conveyor means, this carrier strip then being separated from the film and discarded.

The film may continue through the housing through various runs of the conveyor and be neutralized, and washed, the film passing through the wipers 18 to remove excessive solution therefrom, it being understood that the film has been dried in each of its runs through the medium of the heat elements 54.

Of course, in the case of multisolution developers or for reversal processing, more stages or runs are necessary, and the invention is not to be limited to only the two stages depicted in the drawings.

In some circumstances, the developing, clearing and fixing chemicals may be rolled or calendered directly onto the film from the conveyor rollers 44 and 46.

From the foregoing description, it will be seen that there is provided an apparatus for quickly developing film which may be easily adjusted to the particular characteristics of the film being developed to obtain the proper solution concentrations, etc.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An apparatus for the rapid developing of film comprising a housing, exposed film holding means connected with said housing and arranged to dispense the film therein, a web in said housing and having developing solution thereon, a first roller over which said web is passed, means in said housing to convey the film therethrough and bring the emulsion side of the film into initial contact with said web at said first roller, means carried in said housing for immediately applying pressure to said web and film at a plurality of aligned stations in order to impregnate the emulsion on the film with the developing solution, a plurality of heaters in said housing interposed between said stations, plates disposed between said heaters and said film for more evenly distributing heat over the surface of the film whereby the temperature of the film with its emulsion and developing solution may be raised while continuing to rapidly pass through the housing.

2. An apparatus for the rapid developing of film comprising a light proof housing, exposed film holding means connected with said housing and arranged to dispense the film therein, said housing having an entrance slot and an exit slot, said exposed film holding means being adjacent said entrance slot, a lightproof bag enclosing said exposed film holding means, a web in said housing having developing solution thereon, a first roller over which said web is passed, means in said housing to convey the film therethrough and bring the emulsion side of the film into initial contact with said web at said first roller and for applying pressure to said web and film in order to impregnate the emulsion on the film with the developing solution, said conveying and pressure applying means including a plurality of longitudinally spaced pairs of rollers defining between the rollers of each pair a path for the film to follow from said entrance slot through the housing and through said exit slot, the upper roller of each pair being resiliently biased downwardly to apply pressure to said web and said film, said film and said web being moved together due to the contacting relationship and the force exerted by the pairs of rollers.

3. An apparatus for the rapid developing of film comprising a lightproof housing, exposed film holding means connected with said housing and arranged to dispense the film therein, said housing having an entrance slot and an exit slot, said exposed film holding means being adjacent said entrance slot, a lightproof bag enclosing said exposed film holding means, a web in said housing having developing solution thereon, a first roller over which said web is passed, means in said housing to convey the film therethrough and bring the emulsion side of the film into initial contact with said web at said first roller and for applying pressure to said web and film in order to impregnate the emulsion on the film with the developing solution, said conveying and pressure applying means including a plurality of longitudinally spaced pairs of rollers defining between the rollers of each pair a path for the film to follow from said entrance slot through the housing and through said exit slot, the upper roller of each pair being resiliently biased downwardly to apply pressure to said web and said film, said film and said web being moved together due to the contacting relationship and the force exerted by the pairs of rollers, a plurality of heaters in said housing interposed between said pairs of rollers and disposed on either side of said film and web.

4. An apparatus for the rapid developing of film comprising a lightproof housing, exposed film holding means connected with said housing and arranged to dispense the film therein, said housing having an entrance slot and an exit slot, said exposed film holding means being adjacent said entrance slot, a lightproof bag enclosing said exposed film holding means, a web in said housing having developing solution thereon, a first roller over which said web is passed, means in said housing to convey the film therethrough and bring the emulsion side of the film into initial contact with said web at said first roller and for applying pressure to said web and film in order to impregnate the emulsion on the film with the developing solution, said conveying and pressure applying means including a plurality of longitudinally spaced pairs of rollers defining between the rollers of each pair a path for the film to follow from said entrance slot through the housing and through said exit slot, the upper roller of each pair being resiliently biased downwardly to apply pressure to said web and said film, said film and said web being moved together due to the contacting relationship and the force exerted by the pairs of rollers, a plurality of heaters in said housing interposed between said pairs of rollers and disposed on either side of said film and web, means in advance of said exit slot for separating said web from said film and transporting said film to said exit slot so that only the film will be moved through said exit slot, said last mentioned means including a crowned roller and a grooved roller cooperating therewith to arch the film and place it into a substantially self-sustaining state.

5. An apparatus for the rapid developing of film comprising a lightproof housing, exposed film holding means connected with said housing and arranged to dispense the film therein, said housing having an entrance slot and an exit slot, said exposed film holding means being adjacent said entrance slot, a lightproof bag enclosing said exposed film holding means, a web in said housing having developing solution thereon, a first roller over which said web is passed, means in said housing to convey the film therethrough and bring the emulsion side of the film into initial contact with said web at said first roller and for applying pressure to said web and film in order to impregnate the emulsion on the film with the developing solution, said conveying and pressure applying means including a plurality of longitudinally spaced pairs of rollers defining between the rollers of each pair a path for the film to follow from said entrance slot through housing and through said exit slot, the upper roller of each pair being resiliently biased downwardly to apply pressure to said web and said film, said film and said web being moved together due to the contacting relationship and the force exerted by the pairs of rollers, a plurality of heaters in said housing interposed between said pairs of rollers and disposed on either side of said film and web, means in advance of said exit slot for separating said web from said film and transporting said film to said exit slot so that only the film will be moved through said exit slot, said last mentioned means including a crowned roller and a grooved roller cooperating therewith to arch the film and place it into a substantially self-sustaining state, a plurality of heaters in said housing interposed between said pairs of rollers and disposed on either side of said film and web.

References Cited in the file of this patent

UNITED STATES PATENTS

| | | |
|---|---|---|
| 1,308,709 | Hamburger | July 1, 1919 |
| 1,757,950 | Allin | May 13, 1930 |
| 1,798,414 | Gronau | Mar. 31, 1931 |
| 1,804,793 | Langsner | May 12, 1931 |
| 1,816,360 | Cawely | July 28, 1931 |
| 1,928,235 | Taylor | Sept. 26, 1933 |
| 1,999,965 | Hall | Apr. 30, 1935 |
| 2,419,853 | Pask | Apr. 29, 1947 |
| 2,761,365 | Bridgewater | Sept. 4, 1956 |

FOREIGN PATENTS

| | | |
|---|---|---|
| 290,918 | Switzerland | Aug. 17, 1953 |